Aug. 2, 1932.　　　G. J. COOKE　　　1,869,933
SEAL FOR ROTATING SHAFTS
Filed Feb. 10, 1926
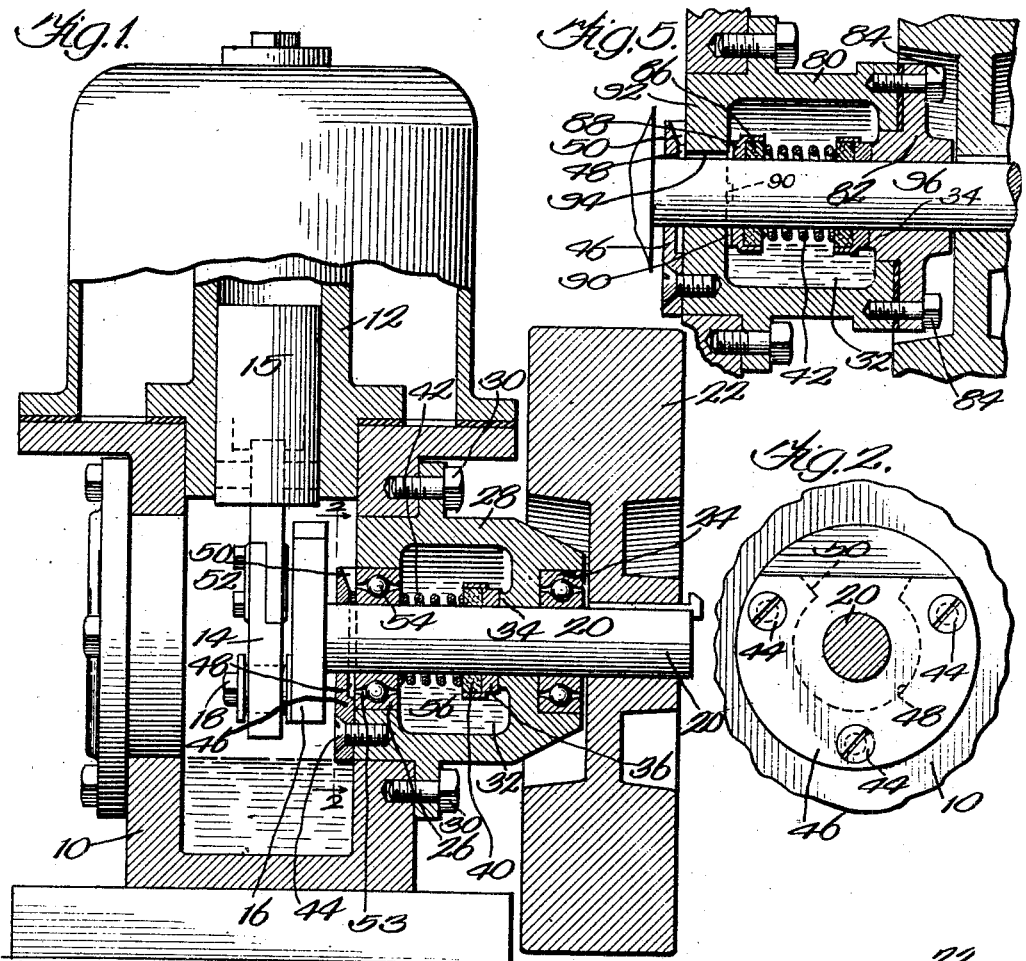
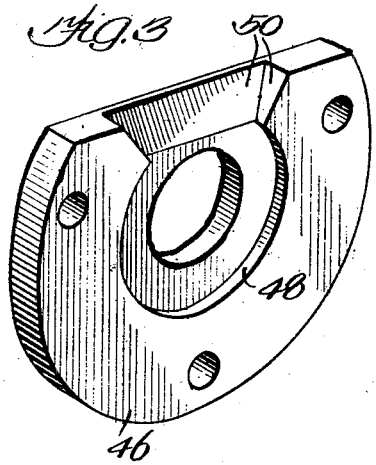
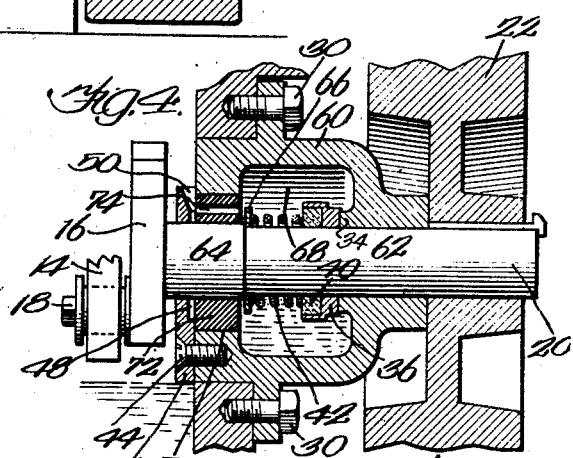
Inventor:
George J. Cooke
By Cheever & Cox Attys.

Patented Aug. 2, 1932

1,869,933

UNITED STATES PATENT OFFICE

GEORGE J. COOKE, OF CHICAGO, ILLINOIS, ASSIGNOR TO COOKE ELECTRIC REFRIGERATION COMPANY, OF CHICAGO, ILLINOIS, A CORPORATION

SEAL FOR ROTATING SHAFTS

Application filed February 10, 1926. Serial No. 87,270.

This invention is a device for solving the ancient problem of preventing the escape of compressed air or gas located on the interior of a machine past the journal of a rotating shaft located partly inside and partly outside of the machine, as for instance, in ice machines, where the escape of ammonia contained within the machine is not only wasteful but interferes with the functioning of the machine, reducing its operating efficiency.

The object of this invention is to provide a new mounting for seal rings for preventing the escape of gas between a shaft and fixed parts of the machine; for instance, rings such as shown in prior Patent No. 1,545,080, of July 7, 1925, the whole mounting being so arranged that it in no way disturbs the operation of the piston crank mechanism, and other parts of the engine in which it is applied.

The invention consists in the provision of a simple mechanism for accomplishing the foregoing and other objects; which can be easily and cheaply made; which is satisfactory in use and does not readily get out of order.

More particularly, the invention consists in the provision of numerous features and details of construction which will be hereafter more fully set forth in the specification and claims.

Referring to the drawing in which like numerals represent the same parts throughout the several views:

Figure 1 is a side elevation, largely in section, of a machine of the general class described, having a shaft bearing equipment illustrating this invention in its preferred form.

Figure 2 is an end view on the line 2—2 of Figure 1.

Figure 3 is a perspective view of an oil directing collar shown in face view in Figure 2.

Figure 4 is a sectional view of an alternative construction replacing the bearing construction of Figure 1.

Figure 5 is a modified construction showing a different washer substituted for washer 66 of Fig. 4.

The mechanism of this invention is shown in Figure 1 used in connection with the crank case 10 of a conventional refrigerating machine or engine, having a cylinder 12, crank rod 14, piston 15, crank arm or disc 16, crank pin 18, operating in connection with a shaft 20 extending outside the case and there carrying a flywheel 22.

Shaft 20 rotates in a pair of antifriction, specifically, ball bearings 24 and 26, located at opposite ends of a bearing block 28 suitably fitted into and constituting a part of one side wall of the crank case 10, being detachably secured thereto by any suitable means, as, for instance, bolts or lag screws 30. The bearing block is hollowed out between the anti-friction bearings 24 and 26 to form an oil chamber 32 through which the shaft 20 passes. The oil chamber 32 is so formed within the bearing block as to leave, adjacent to the anti-friction bearing 24, a solid wall abutment or annular boss 34 against which the seal ring 36, corresponding to ring 42 of said prior Patent No. 1,545,080, takes bearing to form a running ground joint. Ring 36 is recessed on its side away from abutment 34 for the reception of a compressible washer 40 corresponding in general construction and function to washer 40 of said prior patent. This washer 40, which closely embraces shaft 20, is engaged by one end of an encircling compression spring 42 whose opposite end engages the inner ball race of the anti-friction bearing 26 which rotates with the spring and the shaft 20. Spring 42 is loose enough on shaft 20 and inside of chamber 32 so that during rotation of the shaft 20, it acts freely against a suitable retaining washer which may be made of steel or the like to compress washer 40 and thus force it against the circumferential surface of shaft 20, and it also exerts sufficient pressure to force ring 36 into close sealing contact with the boss 34, forming a secure ground joint between the boss and the ring and thus preventing the escape of either gas or oil at this point. The inner race of the bearing 26, the spring 42 and the oil ring 36—40 rotate in unison, and there is no frictional wear between any of these parts.

Rigidly secured to the inner end of the bearing block 28 and inside of the crank case 10, by any suitable means, such as screws 44, is a plate 46 embracing shaft 20. The face of this plate 46 immediately adjacent the bearing block 26 is recessed to form an annular oil passage 48, enterable from the top of the plate through the semi-conical mouth 50 which is open to the interior of the crank case 10. The oil passages 48 and 50 communicate with a horizontal passage 53 extending between the races of bearing 26 and past balls 54, delivering oil into interior 32 of block 28.

As in all engines of this type, a body of oil 56 is provided within the crank case which is engaged by the crank mechanism 14—16 heretofore described and splashed all over the interior of the chamber 52 within the crank case, thereby oiling the piston 15 as well as the crank mechanism. Some of this splashed oil enters mouth 50, heretofore described, and thence passes through the passage 48 into and through passages 53 and into the oil chamber 32, thus providing oil 56 within that chamber in sufficient quantity and of sufficient height so that the ring 36 and washer 40 engage it and are thoroughly lubricated in the manner fully set forth in said prior patent.

The construction just described has a distinct advantage over prior devices in that the spring 42 bears against a permanently located relatively, stationary bearing device 26 and does not cause binding of the parts and consequent disturbance of the action of piston 15 or of the crank mechanism associated therewith, as takes place in certain of the prior devices where a corresponding spring is located at an entirely different point in the mechanism.

The alternative construction of Figure 4 differs from that of Figure 1 in that the bearing block 60 is not provided with anti-friction devices and that shaft 62 is provided with an enlargement or shoulder 64 adjacent the crank case 10. In this construction, the spring 42 bears at its inner end against a washer 66 arranged on shaft 62 and bearing against the enlarged shoulder 64, as distinguished from reacting against the anti-friction device 26 of the preferred construction. The parts are or may be assembled in the interior space 68 of this modified bearing block through an opening 70 in the inner end of the block normally closed by a bushing 72, constructed as shown and provided with an oil passage 74 corresponding in oil distributing function to the passage 52 in the roller bearing 26. In this construction, the washer 66 is held stationary against the shoulder 64 by spring action with the non-wear results as occur between the spring and the washer of the preferred construction.

In both constructions, the oil in the bearing block is best maintained at least as high as the bottom of the shaft which extends through the particular block.

The oil passage recessed plate 46 shown in Figure 3, and its fastening bolts, serve—in the two constructions shown—the function of so securely fastening the left hand bearing of Figure 1 and the bushing of Figure 4 in place that the left hand end of the shaft encircling spring has no effect whatever upon the free movement of the piston 15 and the attached parts. However the shaft 20 or 62 is freely journaled in the plate which has no action as a step bearing to prevent end play.

Figure 5 shows a bearing block 80 differing from bearing block 60 in that the spring and seal ring devices are inserted through an opening in the righthand end, closed by a bearing carrying cover 82, held in place by bolts or screws 84 in lieu of being inserted through the space in block 60, closed by the bearing 72. The spring mechanism of Figure 5 also differs from that of Figure 4 in that the washer 66 of Figure 4 is replaced by a seal ring 86—88, identical in construction with ring 36—40 but reversed in position on the shaft. The bearing surface 88 of this ring has substantially radial oil channels 90 cut in its face, adjacent the wall 92 of the block 80, said channels communicating with an oil passage 94 formed through the wall 92 immediately adjacent the shaft 96. Oil is admitted to this passage through the channels 50 and 48 of the plate 46, which functions in this particular construction as in those previously described. The oil so admitted passes into the interior of the chamber 32 of the bearing block 28, being ejected from the passage 94 by centrifugal action through the radial channels 60 upon rotation of the sealing ring 88, the ring being secured upon the shaft by the contraction of the resilient portion 86 under the pressure of the spring 42.

The rings 88 and 36 and the resilient packing 86 and 40 is of such size that during assembly they may be freely moved along the shaft. When they are in final position engaging the boss 34 on the wall 92, the spring 42 presses upon the resilient portion which being arranged within the annular seat of the rings 36 and 88 is squeezed inwardly and firmly engages the shaft.

As a result of this construction, the spring 42 compresses the packing rings 86 and 40 upon the shaft so that both rings are held stationary with respect to the shaft. Destruction of the rings due to relative motion between them and the shaft is thus prevented, the frictional engagement of the rings upon the shaft being greater than that between the rings and the block 80, the boss 34 or the wall 92. It would be understood that the spring 42 exerts sufficient tension upon the washers 40 and 86 to compress them firmly upon the shaft with a force sufficient to rigidly fasten them on the shaft. Certain materials commonly used for packing purposes, of which rubber is an example, are rapidly deteriorated upon contact with oil and the like but when sufficiently compressed, do not deteriorate. My invention therefore is adapted to utilize this law to lengthen the life of the sealing rings. The engagement between the rings 36 and 88 and the shaft is also sufficiently firm to prevent end play of the shaft and step bearings, shoulders on the shaft and other devices for preventing end play are unnecessary, the rings themselves acting as thrust collars engaging the boss 34 and the wall 92.

The principal advantage of my present invention resides in the novel and detachable features of the seal whereby the entire assembly, being assembled as a unit in the bearing block, may be quickly and easily removed; in the novel means of securing the shaft against end play by the use of the sealing members themselves as thrust collars; and in the novel and simple means of supplying oil to the interior of the chamber housing the sealing devices.

Having thus described my invention, what I claim as new and desire to secure by Letters Patent is:

1. The combination with a casing containing gases under pressure and a rotating shaft extending through a wall of said casing, of a seal for preventing the escape of gases from the casing along the shaft, comprising a demountable journal support for said shaft secured in said wall and having opposed walls in which the shaft is journalled and a cavity between said walls, one of said walls having an oil channel formed therethrough adjacent the shaft, a sealing device comprising spaced annular members arranged on said shaft and resilient means reacting between said members to urge them apart along the shaft and into engagement with the opposed walls of said journal support, means for securing said members in position on the shaft, a said member having a radial channel formed in its face communicating with the said oil channel to eject oil received therefrom into said chamber.

2. In a seal for preventing the escape of gases under pressure axially along a shaft rotatably mounted through a wall, the combination, with the shaft, of spaced walls providing bearing support for said shaft, said walls providing a liquid reservoir adjacent said shaft, a said wall being formed with a channel communicating therethrough with said reservoir, adjacent the shaft, sealing means comprising spaced annular members arranged on said shaft, and resilient means reacting between said members to urge them apart along the shaft and into engagement with the opposed walls of said journal support to form a running seal therewith, said members dipping into the liquid in said reservoir to lubricate the running seal and to provide a sealing film at said point, a said member having a radial channel formed on its face communicating with the said oil channel to eject fluid into said reservoir.

3. In combination with a shaft, a wall through which the shaft extends, means forming a housing on one side of a wall in which a portion of the shaft extends, means forming an oil channel communicating through said wall with the housing, a seal comprising an annular member embracing said shaft adjacent the wall through which the shaft extends, said annular member having a bearing surface adapted to co-operate with the surface of the wall portion to provide a running seal therebetween, means urging the said annular member resiliently against the wall, the said annular member having a resilient portion adapted to embrace the shaft, means for compressing said resilient portion upon the shaft, said annular member having a radial channel formed in its face and communicating with the said oil channel whereby to eject oil received from said channel into the said housing.

4. In combination with a shaft, spaced walls having openings through which the shaft extends, and means co-operating with said walls to form a housing encircling a portion of the shaft, means forming an oil channel adjacent said shaft and communicating from one side of a said wall into the housing, whereby oil may be ejected through said wall and into said housing, a seal device comprising spaced annular members encircling said shaft, and having surfaces adapted to co-operate with portions of the opposed walls whereby to form running seals around the wall openings through which the shaft extends, resilient means reacting between said members to urge them apart along the shaft and into engagement with the opposed walls, said annular members being provided with resilient portions embracing the shaft, means for compressing said portions upon the shaft to form a driving and sealing connection between the shaft and annular members, a said annular member having a radial groove formed in its wall engaging face in position to communicate with the said channel whereby to eject fluid, received through said channel, into said housing.

5. The combination with a rotary machine having a housing provided with a wall portion through which a shaft extends out of the housing, said housing including an oil receptacle within the housing, of a seal for the wall opening through which the shaft extends out of the housing, said seal comprising an annular member embracing said shaft adjacent the wall portion through which it extends, said annular member having a metallic bearing surface adapted to co-operate with a surface of the wall portion to provide a running seal therebetween, means urging the said bearing surface resiliently against the wall portion, said annular member being also provided with an annular rubber gasket adapted to lie against the shaft, means creating a pocket into which the annular member extends, means to supply the pocket with oil from the receptacle, and means for compressing the rubber gasket to secure it firmly to the shaft whereby the annular member is caused to rotate with the shaft whereby to prevent leakage along the shaft past the gasket.

6. The combination with a rotary machine having a housing provided with a wall portion through which a shaft extends out of the housing, said housing including an oil receptacle within the housing, of a seal for the wall opening through which the shaft extends out of the housing, said seal comprising an annular member embracing the shaft adjacent the wall portion, said annular member having a face adapted for co-operation with a surface of the wall portion to provide a running seal therebetween, means urging the said member resiliently against the wall portion, said annular member having a resilient portion comprising a rubber ring adapted to encircle the shaft, means creating a pocket in which the annular member extends, means to supply the pocket with oil from the receptacle, and means for compressing the rubber ring whereby it may contract upon the shaft so that the annular member may be caused to rotate with the shaft whereby to prevent leakage along the shaft past the gasket.

7. A seal for a rotating shaft which extends through a wall comprising an annular cup-shaped member adapted to encircle the shaft and free to rotate and move longitudinally thereon, said cup having a bottom adapted to seat upon the wall around the shaft and form a ground joint therewith, an annular rubber-like gasket adapted to encircle the shaft within the cup and a spring adapted to encircle the shaft and press the gasket into the cup, and squeeze same into firm sealing contact with the shaft, neither cup, spring nor gasket having any positive driving connection with the shaft but being rotated thereby solely through the frictional engagement of the rubber-like gasket on the shaft.

8. In combination with a shaft, spaced walls having openings through which the shaft extends, and means co-operating with said walls to form a housing encircling a portion of the shaft, a seal device comprising spaced annular members encircling said shaft, and having surfaces adapted to co-operate with portions of the opposed walls whereby to form running seals around the wall openings through which the shaft extends, resilient means reacting between said members to urge them apart along the shaft and into engagement with the opposed walls, said annular members being provided with resilient portions embracing the shaft, means for compressing said portions upon the shaft to form a driving and sealing connection between the shaft and annular members.

In witness whereof, I have hereunto subscribed my name.

GEORGE J. COOKE.